United States Patent [19]

Scheibelhoffer et al.

[11] Patent Number: 5,670,561
[45] Date of Patent: Sep. 23, 1997

[54] COLOR CONCENTRATES AND POLYMER COMPOSITIONS CONTAINING THE SAME, AND METHODS OF MAKING THE SAME

[75] Inventors: Anthony S. Scheibelhoffer, Norton; Richard L. Abrams, North Royalton; Dianna B. Dusek, Oakwood Village; Dennis L. Hammond, Richfield; Robert J. Opalko, Middleburg Heights; Ronald E. Thompson, Parma, all of Ohio

[73] Assignee: Ferro Corporation, Cleveland, Ohio

[21] Appl. No.: 662,488

[22] Filed: Jun. 13, 1996

Related U.S. Application Data

[63] Continuation of Ser. No. 332,816, Oct. 31, 1994, abandoned.

[51] Int. Cl.$^6$ .................. C08J 3/22; C08K 5/00
[52] U.S. Cl. .................. 523/351; 524/80; 524/270; 524/430; 524/764; 524/848; 106/401; 106/493
[58] Field of Search .................. 524/88, 270, 430, 524/496, 764, 848; 106/401, 493, 500; 523/351

[56] References Cited

U.S. PATENT DOCUMENTS

| | | | |
|---|---|---|---|
| 3,185,655 | 5/1965 | Dersnah et al. | 523/351 |
| 3,591,409 | 7/1971 | Aubrey et al. | 117/100 C |
| 3,914,489 | 10/1975 | Smedberg | 524/488 |
| 4,430,468 | 2/1984 | Schumacher | 524/109 |
| 4,495,128 | 1/1985 | Stoffelsma | 264/211 |
| 4,508,771 | 4/1985 | Peoples, Jr. et al. | 428/95 |
| 4,838,945 | 6/1989 | Fuji et al. | 134/7 |
| 4,940,754 | 7/1990 | Lensmire et al. | 524/75 |
| 4,957,949 | 9/1990 | Kamada et al. | 523/201 |
| 5,087,653 | 2/1992 | Obama et al. | 524/158 |
| 5,139,694 | 8/1992 | Kmiec | 252/174.23 |
| 5,157,067 | 10/1992 | Burditt et al. | 524/270 |
| 5,236,514 | 8/1993 | Leung et al. | 134/22.14 |
| 5,238,608 | 8/1993 | Obama et al. | 252/535 |
| 5,264,280 | 11/1993 | Chundury et al. | 428/330 |
| 5,443,768 | 8/1995 | Scheibelhoffer et al. | 264/39 |

FOREIGN PATENT DOCUMENTS

| | | |
|---|---|---|
| 2006350 | 6/1990 | Canada . |
| 277598 | 8/1988 | European Pat. Off. . |

OTHER PUBLICATIONS

Derwent Abstract for JP-A-6 093 201, Apr. 5, 1994.
Derwent Abstract for JP-A-60 096 622, May 30, 1985.
Derwent Abstract for JP-A-1 108 268, Apr. 25, 1989.
Patent Abstract of Japan JP-A-06 256 531, Sep. 13, 1994.
Derwent Abstract DE 4,202,618 Aug. 6, 1992, "Cleaning Composition For Thermoplastics Processing Machines—Comprising . . . ".
Application Serial No. 08/171062 filed Dec. 31, 1993, Scheibelhoffer et al., "Abrasive And Purge Compositions".

*Primary Examiner*—Tae Yoon
*Attorney, Agent, or Firm*—Renner, Otto, Boisselle & Sklar

[57] ABSTRACT

The present invention provides a color concentrate comprising (a) at least one resin selected from the group consisting of a polymer of a diene, a rosin material, a coumarone-indene resin, a polymer of vinyl aromatic monomer having an $M\bar{n}$ of from about 500 to about 4000, a wax and a mixture of two or more thereof, (b) at least one resin selected from the group consisting of a copolymer of an olefin and an acrylate or a methacrylate, a polymer of a vinyl aromatic monomer having an $M\bar{n}$ of at least about 10,000 and a mixture thereof, and (c) at least one colorant.

20 Claims, No Drawings

COLOR CONCENTRATES AND POLYMER COMPOSITIONS CONTAINING THE SAME, AND METHODS OF MAKING THE SAME

This is a continuation of application Ser. No. 08/332,816 filed on Oct. 31, 1994 now abandoned.

FIELD OF THE INVENTION

This invention relates to color concentrates and polymer compositions containing the same. The invention also relates to a method of providing color to polymer compositions.

BACKGROUND OF THE INVENTION

Incorporating color concentrates into plastics is known. Color concentrates with high levels of colorants or pigments are desirable. However, high levels of colorants may lead to brittle concentrates that produce unwanted dust upon preparation and handling.

Many highly loaded commercial color concentrates use a low viscosity wax, such as a castor wax, bis-stearamides, or pentaerythritol esters. These materials, however, lead to extruder screw slippage and reduced extrusion rates when added as concentrates to polymer compositions.

The prior art provides various types of color concentrates. For example, U.S. Pat. No. 3,591,409, issued to Aubrey et al, relates to a process for coating resin granules by high intensity mechanical blending and product obtained thereby. The process involves subjecting a mixture of the discrete thermoplastic resin particles, a hydrocarbon wax and a particulate solid material to high intensity blending at elevated temperatures.

U.S. Pat. No. 4,495,128, issued to Stoffelsma, relates to methods for coloring polyvinylchloride. The coloring composition comprises at least 40% by weight of coloring pigment and at most 60% by weight of glycerolmonostearate.

U.S. Pat. No. 5,157,067, issued to Burditt et al, relates to liquid colorant/additive concentrates for incorporation into plastics. The liquid concentrate comprises (I) a vehicle comprising (a) at least one organic rosin material, and (b) at least one surfactant; and (ii) at least one colorant or additive.

Canadian Patent Application 2,006,350, naming Bes et al, relates to a method for the production of a pulverant composition containing dyestuff and/or pigment composition particles. The dyestuff and/or pigment particles are prepared by mixing an aqueous paste containing dyestuff and/or pigment particles in a plastic emulsion, removing water, and pulverizing the mass obtained.

It is desirable to have color concentrates which are highly loaded with colorants and which efficiently transfer mechanical energy, with little or no screw slippage. It is desirable to have color concentrates which have good dispersion of the colorant in the color concentrate and which distribute uniformly in the polymer to be colored. It is also desirable to have a color concentrate which may be prepared in normal polymer processing equipment, such as an extruder. The color concentrates of the present invention provide one or more of these benefits.

SUMMARY OF THE INVENTION

This invention relates to a color concentrate comprising (a) at least one resin selected from the group consisting of a polymer of a diene, a rosin material, a coumarone-indene resin, polymers of vinyl aromatic monomers having an $\overline{M}n$ of from about 500 to about 4000, a wax material and a mixture of two or more thereof, (b) at least one resin selected from the group consisting of a copolymer of an olefin and an acrylate or a methacrylate, a polymer of a vinyl aromatic monomer having an $\overline{M}n$ of at least about 10,000 and a mixture of two or more thereof, and (c) at least one colorant. This invention also relates to polymer compositions containing the color concentrate.

The color concentrates of the present invention are not brittle and produce little or no dust. The color concentrates have good dispersion of colorant in color concentrate. The color concentrates provide efficient transfer of mechanical energy, with little or no screw slippage and they distribute uniformly in the polymer to be colored. The concentrates may be prepared in normal processing equipment, such as an extruder.

DETAILED DESCRIPTION OF THE PREFERRED EMBODIMENTS

Throughout this specification and the claims, the term "major amount" means more than 50% by weight such as, for example, 50.1%, 60%, 70%, etc. The term "minor amount" means 50% or less than 50% based on the total weight of the mixture. Of course, regardless of the number of components present, the total amount cannot exceed 100%.

(A) Color Concentrates

The inventors have discovered a combination of polymers or components (a) and (b) when used together provide color concentrates which are highly loaded but also which are not brittle and form little or no dust when pelletized. The color concentrates have good colorant dispersion and may be prepared in normal polymer processing equipment, such as an extruder. The color concentrates do not result in screw slippage or reduce the through-put rate when added to other polymer resins in extruders or injection molding equipment.

(a) Low Melt Viscosity Resins

The color concentrates use a low melt viscosity resin or mixture of resins (a). Typically the resin or resins have a viscosity from about 500 to about 3000, or from about 600 to about 2000, or from about 800 to about 1500 poise at 110° C. at a shear rate of 100 sec$^{-1}$. The viscosities are measured in a cone and plate (Haake) viscometer. Throughout the specification and claims, the range and ratio limits may be combined. Examples of low melt viscosity resins include at least one polymer of a diene, at least one wax material, at least one rosin ester, at least one polymer of a vinyl aromatic monomer having an $\overline{M}n$ of from about 500 to about 4000, at least one coumarone-indene resin, and a mixture of two or more thereof. These resins generally are solid at room temperature and have a softening point of from about 60° C. to about 200° C., or from about 80° C. to about 120° C. Typically, (a) is present in an amount from about 5% to about 25%, or from about 7% to about 20%, or from about 8% to about 15% by weight of the color concentrate.

In one embodiment, (a) has a solubility parameter from about 10 to about 30, or from about 15 to about 25 (MPa)$^{1/2}$. As used here, as well as elsewhere in the specification and claims, the term "solubility parameter" and its values are defined in *Polymer Handbook*, Third Edition, pgs. 519 et seq.

In one embodiment, (a) is a polymer of a diene. The polymer may be a homopolymer or a copolymer of a diene and another monomer, such as ethylene, propylene, or styrene. Preferably, the diene polymer is a homopolymer.

The diene polymer include those having a $\overline{Mn}$ of from about 400 up to about 4000, or from about 500 up to about 3000, or from about 700 up to about 1000. The diene may contain from about 4 to about 18, or from about 4 to about 8 carbon atoms. Examples of dienes include 1,3-butadiene, 1,3-pentadiene, 1,4-pentadiene, isoprene, 1,3-hexadiene, 1,4-hexadiene, 1,3-heptadiene, 1,4-heptadiene, 1,5-heptadiene, 1,3-octadiene, 1,4-octadiene, 1,5-octadiene, and 1,6-octadiene. Examples of useful polymers include polybutadiene, polypiperylene, polyisoprene, polyhexadiene, and polyoctadiene. In one embodiment, the polymer of the diene is a homopolymer. Commercially available polymers of dienes include polybutadienes, polyisoprene, and polypiperylene, such as PICCOPALE 100 from Hercules. PICCOPALE 100 has a $\overline{Mn}$ of 890, a $\overline{Mw}$ of 2350, a $\overline{Mw}/\overline{Mn}$ of 2.6, a viscosity of 1080 poise at 110° C. at a shear rate of 100 sec$^{-1}$ and a solubility parameter of 17.96 (MPa)$^{1/2}$.

In another embodiment, (a) is at least one wax material. Waxes are known in the art and are available from a variety of commercial sources. Such waxes include the (a) animal waxes, e.g., bees wax, spermaceti wax, Chinese insect wax and shellac wax; (b) vegetable waxes, e.g., carnauba wax, candelilla wax, hydrogenated castor oil, ouricury wax, Japan wax, and bayberry wax; (c) mineral waxes, e.g., peat wax, montan wax, ozocerite wax, and petroleum waxes; and (d) synthetic waxes such as low molecular weight polyethylenes (which frequently are partially oxidized) and oxidized hydrocarbon waxes. The synthetic or modified natural waxes may or may not contain polar functional groups such as carboxylic acids, carboxylic acid anhydrides and esters, hydroxyl, aldehyde, ketone, oxirane, sulphonic acids or esters and phosphate esters.

In another embodiment, (a) is at least one organic rosin material. The organic rosin materials are known in the art and are available from a variety of commercial sources. Such materials are based upon or derived from gum, wood and/or tall oil rosins which are mainly a mixture of fused-ring, monocarboxylic acids typified by levo-pimaric acid, abietic acid and isomers thereof having the empirical formula $C_{19}H_{29}COOH$. Other acids, such as dihydroabietic acid ($C_{19}H_{31}COOH$) and dehydroabietic acid ($C_{19}H_{27}COOH$), may also be present in the rosin materials. The rosin materials also include non-polymeric derivatives of rosin acids, such as esters, addition salts, hydrogenates, reduction products and the like. Suitable rosin materials generally have a melt viscosity of from about 500 to about 3000 poise at 110° C. and have a softening point (Hercules drop method) of from about 60° C. up to about 200° C., or from about 80° C. up to about 120° C. The organic rosin materials may have an acid number from 0 to about 180, or from about 3 to about 100, or from about 5 to about 40.

Representative examples of rosin materials include those based upon esters derived from rosin. In one embodiment, the rosin material is a polyol rosin ester. Rosin is composed primarily of pimaric-type acid esters and/or abietic acid esters, including glycerol esters, pentaerythritol esters, triethylene glycol esters, and the like, and their hydrogenates and/or reduction products. Specific examples of organic rosin materials available from Hercules include: STAYBELITE®, a partially hydrogenated (50%) wood rosin; STAYBELITE® ester 10, a glycerol ester of STAYBELITE®; POLY-PALE Resin, 90% abietic acid and/or pimaric type acids and/or isomers thereof; Cellolyn 102, a pentaerythritol rosin ester, modified, having a solubility parameter of 23.37 (MPa)$^{1/2}$ and, preferably, PENTALYN A, a pentaerythritol rosin ester having a viscosity of 1434 poise at 110° C. at a shear rate of 100 sec$^{-1}$, and a solubility parameter of 15.1–20.3 (MPa)$^{1/2}$.

In another embodiment, (a) of the color concentrate is at least one polymer of a vinyl aromatic monomer. Such material includes a polymer of a vinyl aromatic monomer having at least one monomer selected from the group consisting of acrylic acid or ester, methacrylic acid or ester, acrylonitrile and maleic anhydride.

The vinyl aromatic monomer includes styrene and the various substituted styrenes. In one embodiment, the vinyl aromatic monomer is represented by the following formula:

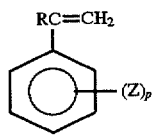

wherein R is hydrogen, an alkyl group containing from 1 to about 6 carbon atoms, or halogen; Z is a member selected from the group consisting of vinyl, halogen and alkyl groups containing from 1 to about 6 carbon atoms; and p is a whole number from 0 up to the number of replaceable hydrogen atoms on the phenyl nucleus. Specific examples of vinyl aromatic compounds such as represented by the above formula include, for example, in addition to styrene, alpha-methylstyrene, beta-methylstyrene, vinyl toluene, 3-methylstyrene, 4-methylstyrene, 4-isopropylstyrene, 2,4-dimethylstyrene, o-chlorostyrene, p-chlorostyrene, o-bromostyrene, 2-chloro-4-methylstyrene, etc. Styrene is the preferred vinyl aromatic compound.

Specific examples of polymers of vinyl aromatic compounds include polystyrene, poly(alpha-methylstyrene), poly(p-methylstyrene) and high impact polystyrene (HIPS). Polystyrene is a preferred vinyl aromatic homopolymer. A commercially available polystyrene, which is useful in this invention is PICCOLASTIC® A5 and A75 polystyrene resin. A commercially available poly(alpha-methstyrene) is Hercules RESA-2393 $\overline{Mn}$=1284 and RESA-2394 $\overline{Mn}$=2737.

Another example of a polymer of a vinyl aromatic monomer is a polymer of a vinyl aromatic monomer and a monomer selected from the group consisting of an unsaturated mono- or dicarboxylic reagent and other vinyl monomers. The carboxylic reagents include carboxylic acids per se and their functional derivatives such as anhydrides, imides, metal salts, esters, etc., which are capable of being forming polymers with the vinyl aromatic monomer. The unsaturated monocarboxylic acid reagents are carboxylic acids and esters corresponding to the formula:

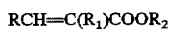

wherein R is hydrogen or a saturated aliphatic or alicyclic, aryl, alkaryl or heterocyclic group; $R_1$ is hydrogen or an alkyl group; and $R_2$ is hydrogen or an alkyl, aryl, or heterocyclic group. Preferably, R is hydrogen or an alkyl group containing from 1 to about 10 carbon atoms. Preferably, $R_1$ is hydrogen or an alkyl group containing from 1 to about 10 carbon atoms. Preferably, $R_2$ is hydrogen or an alkyl group having from 1 to about 10 carbon atoms. The total number of carbon atoms in R and $R_1$ should not exceed 18 carbon atoms. Specific examples of useful monobasic carboxylic reagents include acrylic acid, methacrylic acid, crotonic acid, acrylic anhydride, etc. Specific examples of esters include methyl, ethyl, propyl, and butyl acrylate and methacrylate. The unsaturated carboxylic reagent may comprise a dicarboxylic reagent. An example of dicarboxylic reagents are maleic reagents. The maleic reagents may generally be represented by the formula:

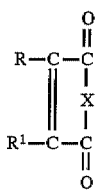

wherein each R or $R^1$ group is hydrogen or an aliphatic or aromatic hydrocarbyl group or the R and $R^1$ groups are joined together to form a fused ring derivative, X is —O— or =$NR^{11}$ where $R^{11}$ is a hydrocarbyl group which may be an aliphatic or an aromatic hydrocarbyl group such as phenyl, methyl, ethyl, propyl, butyl, etc. Preferably both R and $R^1$ groups are hydrogen.

Examples of maleic derivatives which are cyclic or bicyclic compounds include those obtained by a Diels-Alder reaction of butadiene with maleic anhydride or a maleimide. Those obtained by a Diels-Alder reaction of cyclopentadiene with maleic anhydride or maleimide, and those obtained by a Diels-Alder reaction of isoprene with maleic anhydride or an N-substituted maleimide. These cyclic or bicyclic derivatives have high glass transition temperatures. Examples of dicarboxylic reagents include maleic acid, maleic anhydride, fumaric acid, mesaconic acid, itaconic acid, citraconic acid, itaconic anhydride, citraconic anhydride, monomethyl maleate, monosodium maleate, etc.

The copolymers of the vinyl aromatic monomers with maleic anhydride, N-substituted maleimides or metal salts of maleic acid may be obtained, in one embodiment, by polymerizing equimolar amounts of styrene and the co-reactant, with or without one or more interpolymerizable comonomers. In another embodiment, substantially homogeneous copolymers of styrene with maleic anhydride or maleimide or metal salts of maleic acid can be obtained by (1) heating a vinyl aromatic monomer to a temperature at which the vinyl aromatic monomer will polymerize, (2) stirring the polymerizing vinyl aromatic monomer while (3) adding maleic anhydride, maleimide, or the metal salt of maleic acid, or mixtures thereof at a continuous and uniform rate. Generally, the addition of the maleic anhydride, maleimide, or metal salts or esters of maleic acid is made at a rate in moles per unit time that is slower than the rate, in moles per unit time at which the vinyl aromatic monomer is polymerizing. Procedures for preparing such copolymers are known in the art and have been described in, for example, U.S. Pat. No. 2,971,939.

The polymer of a vinyl aromatic monomer may also include a styrene-maleic anhydride copolymer.

Low molecular weight styrene-maleic anhydride copolymers (Mw as low as 1500) also are useful and these are available commercially such as from Monsanto under the designation "Scripset" and from Atochem under the designation "SMA Resins." Sulfonated styrene-maleic anhydride copolymers (and their metal salts) also are available and useful in this invention. Two such products are available from Atochem: SSMA-1000 which is a sulfonated copolymer of about 50% styrene and 50% maleic anhydride; and SSMA 3000, a sulfonated SMA comprising about 75% styrene and 25% maleic anhydride.

Specific examples of copolymers of vinyl aromatic compounds include: styrene-acrylonitrile (SAN); styrene-acrylic acid; and styrene methacrylic acid.

In another embodiment, (a) of the color concentrate is a coumarone-indene resin. These resins are also known as coal tar resins. These resins are derived from cracked petroleum distillates, turpentine fractions, and coal tar. Examples of commercially available coumarone-indene resins include CUMAR R-6, R-9, and R-15 from Neville Chemical Co. A useful coumarone-indene resin is Piccoumarone 450L from Penn. Ind. Chem. and having a solubility parameter of 20.99 $(MPa)^{1/2}$.

(b) High Melt Viscosity Polymer

The color concentrate also includes (b) at least one resin selected from the group consisting of at least one copolymer of an olefin and an acrylic or methacrylic ester, at least one polymer of a vinyl aromatic monomer having an $\overline{Mn}$ of at least about 10,000, and a mixture thereof. The color concentrates generally contain from about 1% to about 25%, or from about 2% to about 20%, or from about 4% to about 15% by weight of component (b). The high melt viscosity polymers have a melt index from about 0.5 to about 50 gm/10 min. The copolymers and polymers of vinyl aromatic monomers typically have a melt index from about 0.5 to about 50, or from about 1 to about 40, or from about 10 to about 30 gm/10 min. Melt index is measured at the conditions and procedures specified in ASTM D-1238. Typically, (b) has a solubility parameter from about 10 to about 30, or from about 15 to about 25 $(MPa)^{1/2}$.

In one embodiment, the olefin used to prepare the copolymer (b) contains from 2 to about 18, or from 2 to about 8 carbon atoms. The olefin is preferably ethylene, propylene, or butylene. Typically, from about 40% to about 95%, or from about 60% to about 90%, or from about 70% to about 85% by weight olefin is used to prepare the copolymer (b).

The acrylic or methacrylic acid esters, used in preparing the copolymer (b), are esters having from 1 to about 30, or from 1 to about 18, or from 1 to about 8 carbon atoms in the ester group. Preferred esters are methyl, ethyl, propyl, and butyl esters of acrylic or methacrylic acid. Generally, from about 5% to about 60%, or from about 10% to about 40%, or from about 15% to 30% by weight acrylic or methacrylic acid ester is used to prepare the copolymer.

The copolymers of the olefin and the acrylic or methacrylic acid esters may be prepared by procedures well known to those skilled in the polymer art. Many such copolymers are available commercially. Examples of specific copolymers include ethylene methyl acrylate copolymers (EMAC) such as those commercially available from Chevron under the designations SP2205, SP2220, SP2255 and SP2260 having methyl acrylate contents of 20%, 20%, 18% and 24% by weight, respectively; from Exxon under the general trade designations "ESCOR" and available in commercial grades designated, e.g., TC110 and TC112 containing 20% and 18% methyl acrylate, respectively. Developmental ESCOR grade copolymers are also available from Exxon containing from 6% by weight of methyl acrylate (XS 11.04) to 28% by weight of methyl acrylate (XS 21.04 and 55.48). LOTRYL 3610 is an ethylene-methyl acrylate copolymer having a methyl acrylate content of 29% by weight and is available from Atochem, Inc. Some developmental EMAC are also available from Chevron under trade designations such as TD1956, TS1967, and TD1972, and these contain 6%, 35%, 42% and 60% by weight of methyl acrylate, respectively.

Also useful are ethylene ethyl acrylates (EEA) such as those available from Union Carbide under the BAKELITE designations DPD-6182, DPD-6169 and DPDA 9169. EBAs (ethylene butyl acrylates) are available from Atochem, Inc. under designations such as 17BG04 (15–18% ester content) and 30BA02 (28–32% ester content). Ethylene butyl acrylate copolymers are also available from Chevron under the trade designation EBAC® 1255-70, 1122-70 and 1260-70 and contain from 5% to about 30% butyl acrylate.

A particularly useful ethylene acrylic ester copolymer is an ethylene-methacrylic acid ester available commercially under the trade name PRIMACOR® from Dow Chemical Company. A particularly useful PRIMACOR® resin is a PRIMACOR® 5981 resin. Another useful alpha-olefin acrylic acid copolymer is an ethylene methylacrylate copolymer sold under the trade name VAMAC® ethylene/acrylic elastomers available commercially from DuPont Company. A particularly useful VAMAC® resin is VAMAC® G elastomer.

In another embodiment, (b) of the color concentrate is one or more polymers of a vinyl aromatic monomer having an $\overline{Mn}$ of at least about 10,000. Suitable polymers of a vinyl aromatic monomer (b) are those as listed and discussed in detail above in connection with the low viscosity resin (a), with the important exception that polymers of a vinyl aromatic monomer (b) must have an $\overline{Mn}$ of at least 10,000. Examples of polymers of a vinyl aromatic monomer having an $\overline{Mn}$ of at least about 10,000 include, for example, high impact polystyrene (HIPS), Dart 108 polystyrene available from Dart Polymer Inc., styrene-maleic anhydride copolymers (SMA) available from ARCO under the general trade designation DYLARK such as DYLARK DBK-290, DYLARK 332, DYLARK 134, DYLARK 132, DYLARK 232 and impact grades DYLARK 150, 250, 350 and 700. Examples of impact modified styrenic and alpha-methyl styrene copolymers with maleic anhydride and acrylonitrile include ARVYL 300MR and 300CR.

(c) Colorant

The color concentrates also include (c) at least one colorant. In one embodiment, the colorant is present in an amount from about 25%, or from about 30%, or from about 40% by weight of the color concentrate. In another embodiment, the colorant is present in an amount up to about 95%, or up to about 85%, or from about 75% by weight.

Because organic colorants have a much lower specific gravity as compared to inorganic colorants, it is sometimes best to consider the amount of colorant loading in the color concentrate on a volume percentage basis. Thus, on a volume basis, the colorant comprises from about 25%, or from about 30%, or from about 35% by volume of the color concentrate. In another embodiment the colorant is present in an amount up to about 60%, or up to about 70% by volume of the color concentrate.

The colorant may be organic or inorganic in nature. The colorant may be one or more of commercially available pigments. Examples of colorants include, but are not limited to Titanium Dioxide, Red Iron oxide, Lead chromate, Ultramarine Blue, Molybdate Orange, Phthalocyanine Blue, Quinacridone, Phthalocyanine Green, Carbon Black, Red Lake C, Black Iron Oxide, etc. Mixtures of these and other pigments may be used to provide a desired color, as is known to those in the art.

(d) Surface Active Agents

The color concentrates also optionally include (d) at least one surface active agent. The surface active agents may be nonionic, cationic, anionic, or amphoteric in nature so long as color concentrates can be produced with high loading of colorant and the compositions are stable. These surface active agents or surfactants are known in the art, and many of these are described in McCutcheon's "Volume 1: Emulsifiers and Detergents", 1992, North American Edition, published by McCutcheon's Division, MC Publishing Corp., Glen Rock, N.J., and in particular, pp. 263–274 which lists a number of cationic, anionic, nonionic and amphoteric surfactants is hereby incorporated by reference for the disclosure in this regard. The amount of the surface active agent included in the color concentrates may be varied within a range from about 0.1% to about 10%, or from about 0.5% to about 5%. or from about 0.7% to about 2% by weight of the color concentrate.

One class of useful surfactants includes those based upon polyesters of hydroxy carboxylic acids of the general formula HO—R—COOH, where R is a divalent hydrocarbon group having at least about 8 carbon atoms; and polyesters prepared from mixtures of such hydroxy carboxylic acids with a carboxylic acid that is free from hydroxy groups. Representative examples of such hydroxy carboxylic acids include ricinoleic acid, mixtures of 9- and 10-hydroxystearic acid and 12-hydroxystearic acid (HSA). Representative examples of carboxylic acids that are free of hydroxy groups are fatty acids, such as lauric acid, palmitic acid, stearic acid and oleic acid. Mixtures of 9- and 10-hydroxystearic acid can be obtained by sulfonation of oleic acid followed by hydrolysis. Sources for 12-hydroxystearic acid include commercially available hydrogenated castor oil fatty acid, which contains minor amounts of stearic acid and palmitic acid. Representative examples of suitable polyester surfactants include: poly-(12-hydroxystearic acid) surfactants. These surfactant may have from about 7 to about 12 polymeric units of 12-hydroxystearic acid. In addition to the 12-hydroxystearic acid, such surfactants may contain a lower level of stearic acid. Also, some of the hydroxy end groups of the poly-(12-hydroxystearic acid) surfactants may be capped with regular stearic acid which has no 12-hydroxy group. A specific example of a suitable poly(12-HSA) surfactant is HYPERMER® LP-1 from ICI which has a degree of polymerization of about 9.

Another class of surface active agents are derivatives of polyester surfactants wherein at least a portion of the acid end groups are amidized. The polyester surfactants can be amidized with N,N-dialkyl-1,3-alkanediamine, for example, N,N-dimethyl-1,3-propanediamine to form end groups. The alkyl and alkane groups generally contain from about 1 to about 8 carbon atoms. HYPERMER® LP-4 available from ICI is a specific example of a suitable amidized polyester is a poly(12-HSA) surfactant wherein about two-thirds of the acid end groups are amidized with N,N-dimethyl-1,3-propanediamine.

The surfactants may also be glycerides and glyceride derivatives. Examples of these nonionic surfactants include glyceride esters, such as the mono-, di- or triglycerides. The glycerides have acyl groups generally containing from about 3 to about 30, or from about 8 to about 30, or from about 10 to about 26, or from about 12 to about 20 carbon atoms. Examples of acyl groups include n-dodecanoate, n-tetradecanoate, n-hexadecanoate, n-octadecanoate, n-eicosanoate, cis-$\Delta^9$-hexadecenoate, and cis-$\Delta^9$-octadecenoate Many of these glyceride esters occur naturally in animal and vegetable fats and oils. Examples of these fats and oils include corn oil, coconut oil, soybean oil, sunflower oil, cottonseed oil, palm oil, tallow, bacon grease, butter, castor oil, tall oil and rosin. The natural oils may also be hydrogenated, sulfated or sulfonated. One useful derivative is obtained by reacting a natural oil, such as corn oil, with an unsaturated acid or anhydride, such as maleic anhydride. Particular examples of useful glycerides include glycerol monodicaprylate, glycerol dicaprylate, glycerol myristate, glycerol 1,3-distearate, glycerol monolaurate, glycerol monooleate, glycerol monoricinoleate, glycerol monostearate, glycerol tributyrate, glycerol tripropionate, glycerol tristearate, glyceryl trioleate, glyceryl tripalmitate, glyceryl triricinoleate, and mixtures thereof.

Useful glyceride derivatives are available commercially from Pflaumer Brothers Inc., Norristown, PA under trade designations, such as TALLICIN Dispersant K-2 and Ester 253. Other glyceride-based dispersants are available from: Huls America Inc. under such trade designations as IMWI-TOR 440 identified as mono/diglyceride of natural oils, IMWITOR 742 identified as glycerol mono/diester of medium chain fatty acids. IMWITOR 908 identified as glyceryl mono/dicaprylate, etc., from Eastman Chemical Co. under the trade designations as MYVEROL SMG VK (succinylated distilled monoglycerides from hydrogenated palm oil or palm stearin); MYVATEX 3-50K (blend of vegetable-fat-derived distilled monoglycerides and distilled propylene glycol monostearate); etc.

In another embodiment, the surface active agent may be a phosphate ester or sodium salt of a phosphate ester. The phosphoric acid esters are generally prepared by reacting saturated and/or unsaturated alcohols with phosphoric acid. The alcohols may be alkoxylated. The phosphoric acid esters are described in U.S. Pat. No. 4,430,239, issued to Wyman. This patent is incorporated by reference for such disclosure. Commercially available phosphoric acid ester include the Dextrol OC series of phosphate esters, available from Dexter Chemical Corp. A particularly useful phosphate ester is Dextrol OC 70, which is believed to be a phosphoric acid ester of an alkoxylated alcohol.

In one embodiment, the color concentrates of invention contain less than about 0.1%, or less than about 0.05%, or less than about 0.01% by weight of water. In one embodiment, the color concentrates are substantially free of water. In another embodiment, the color concentrates are free of wax, such as castor wax, bis-fatty amides (bis-stearamides), and/or pentaerythritol esters.

It will be appreciated that the color concentrate of the present invention may include conventional additives. Such additives include, for example, heat stabilizers and UV stabilizers.

The color concentrates may be prepared by any means known to those in the art. In one embodiment, the color concentrate is prepared in a two step process. In the first step, the dry components of the composition are blended in a high intensity mixer, such as a Prodex or Henschel mixer. If a liquid component, such as a surfactant, is included in the formula, it is added to the dry components while they are being blended in the high intensity mixer. In the high intensity mixer, the temperature is maintained below the temperature of the lowest melting component of the mixture. In the second step, the blended ingredients from the first step are melt mixed in an internal mixer, such as an extruder or Banbury mixer. This is followed by pelletizing or grinding the cooled mixture. The color concentrates may also be prepared in a continuous process or, such as a Farrell "CP" processor.

The details of mixing can be illustrated with the preparation of Example 6 below. A pigment blend containing polypiperylene (Hercules PICCOPALE 100) and ethylene methyl acrylate copolymer (Chevron EMAC SP2220) are added to a Henschel high intensity mixer. After two minutes of mixing on low speed with a tip speed of 20 m/sec, the surface active agent (DEXTROL OC-70) is added slowly to the batch while continuing to mix on low speed.

The blended mixture from the previous process is fed into an 80 mm twin screw extruder (APV). The extruder barrel temperature profile ranged from 127° to 149° C. The screw speed was set at 160 RPM. This gave an output rate of 175.5 kilograms per hour. The extrudate was passed through a 3.1 mm diameter three hole die to produce strands which were discharged to a water slide pelletizing system (Conair Jetro).

The following examples illustrate the color concentrates utilized in the present invention. Unless otherwise indicated in the following examples and elsewhere in the specification and claims, all parts and percentages are by weight, temperatures are in degrees centigrade, and pressure is at or near atmospheric pressure.

| Color concentrates | Parts by Weight |
|---|---|
| Example 1 | |
| Titanium Dioxide | 82 |
| PICCOPALE 100 | 13 |
| SP2220 (20% MA) | 5 |
| Example 2 | |
| Carbon Black | 82 |
| PENTALYN A | 13 |
| SP2220 (20% MA) | 5 |
| Example 3 | |
| Phthalocyamine Blue | 82 |
| CUMAR R-6 | 13 |
| SP2220 (20% MA) | 5 |
| Example 4 | |
| Cadmium Sulfide Yellow | 80 |
| Titanium dioxide | 5 |
| PICCOPALE 100 | 10 |
| ESCOR TC112 (18% MA) | 5 |

| | Concentrates | | | | |
|---|---|---|---|---|---|
| | 5 | 6 | 7 | 8 | 9 |
| $TiO_2$ | 70.00 | — | — | — | — |
| Inorganic Pigment Mixture* | — | 85.00 | 85.0 | 85.0 | 85.0 |
| PICCOPALE | 19.04 | 9.20 | 9.17 | 18.51 | 12.48 |
| EMAC SP2220 | 10.25 | 4.95 | 4.93 | 5.66 | 6.72 |
| Dextrol OC-70 | 0.70 | 0.85 | 1.14 | 0.83 | 0.80 |

*Pigment Mixture = A gray inorganic pigment blend available from the Ferro Corporation under the trade designation V6797.

Polymer Compositions

As described above the color concentrates are useful in providing color to polymer compositions. In one embodiment, the color concentrate is present in the polymer composition in amounts from about 0.1% to about 15%, or from about 0.5% to about 9%, or from about 0.7% to about 7% by weight. The polymer (B) is present in a major amount. In one embodiment, the polymer (B) is present in an amount at least about 70%, or at least about 80%, or at least about 90% by weight of the purge composition polymer. (B) is other than (a) and (b) above.

(B) Polymers

A wide variety of polymers and resins may be utilized in the colored polymer compositions. These include thermoplastic, as well as, thermosetting polymers and resins. Among the polymers which may be utilized are polyolefins and olefin copolymers, polyesters, polyphenylene ether resins (PPO), polystyrene and styrene copolymers, polyamides, polyimides, polyurethanes, acrylic resins, polycarbonates, ABS resins, polyvinylchloride, allyl polymers, epoxy resins, phenolic resins, thermosetting polyesters, urea and melamine formaldehyde resins, etc.

Examples of polyolefins and olefin copolymers include, for example, polyethylene, polypropylene, ethylene propylene copolymers, polybutylene, EVA, etc. Various forms of polyethylene can be utilized including low-density polyethylene, high-density polyethylene, etc. Examples of styrene copolymers include high impact polystyrene (HIPS), styrene-maleic anhydride copolymer (SMA), styrene-acrylonitrile copolymer (SAN), styrene-methylacrylate copolymers, styrene-butadiene or styrene-isoprene block copolymers or their hydrogenated versions. Nylon is an example of a useful thermoplastic polyamide. PET and PBT are examples of useful polyesters. A particularly useful polymer is polyvinylchloride (PVC). Examples of PVC polymers include rigid PVC (Premium 1401-11N) and a rigid PVC blend available from Alcan containing 10% $TiO_2$. The selection of a particular polymer for use in the polymer compositions will depend in part upon the intended use. The selection of a polymer can be readily made by one skilled in the art depending on the particular application and the user's preferences.

The polymer compositions may be prepared by blending the color concentrate with at least one polymer as is known to those in the art. For example the color concentrate may be blended into the polymer by mixing in a ribbon blender or tumble blender. For example, the colored polymer composition may be prepared by letting down the color concentrate and polymer in a high intensity mix (such as those described above). The mix is then extruded using a twin screw extruder equipped with a tape, profile, or pipe die.

The following are examples of colored polymer compositions of the present invention.

| Colored Compositions | |
|---|---|
| | Percent by Weight |
| Example A | |
| Polypropylene | 90 |
| Color concentrate of Example 1 | 10 |
| Example B | |
| High density polyethylene (HDPE) | 95 |
| Color concentrate of Example 4 | 5 |
| Example C | |
| Polystyrene | 93 |
| Color concentrate of Example 7 | 7 |
| Example D | |
| Rigid PVC | 94 |
| Color concentrate of Example 7 | 6 |

| Polymer | E | F | G | H |
|---|---|---|---|---|
| Rigid PVC[1] | 88.94 | 88.90 | 88.84 | — |
| Rigid PVC[2] | — | — | — | 97.78 |
| $TiO_2$ | 8.89 | 8.89 | 8.88 | — |
| Ca Stearate | 0.33 | 0.33 | 0.33 | 0.33 |
| Concentrate 6 | — | — | — | 1.89 |

| Polymer | E | F | G | H |
|---|---|---|---|---|
| Concentrate 7 | 1.84 | — | — | — |
| Concentrate 8 | — | 1.88 | — | — |
| Concentrate 9 | — | — | 1.95 | — |

[1] Premium 1401-11N PVC Blend
[2] Alcan Rigid PVC Blend Containing $TiO_2$

The colored polymer composition have improved color strength, showing better dispersion of pigments. Also, the color polymer composition have improved impact resistance. While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A color concentrate comprising (a) at least one resin selected from the group consisting of a homopolymer of a diene, a rosin material, a coumarone-indene resin, a polymer of a vinyl aromatic monomer having an $\overline{Mn}$ of from about 500 to about 4000, and a mixture of two or more thereof, (b) at least one resin selected from the group consisting of a copolymer of an olefin and an acrylate or a methacrylate, a polymer of a vinyl aromatic monomer having an $\overline{Mn}$ of at least about 10,000 and a mixture of two or more thereof, and (c) from about 25% up to about 95% by weight at least one organic colorant.

2. The color concentrate of claim 1 wherein (a) has a melt viscosity from about 500 to about 3000 poise at 110° C. at a shear rate of 100 $sec^{-1}$.

3. The color concentrate of claim 1 wherein (a) is at least one polymer of a diene.

4. The color concentrate of claim 3 wherein the diene has from 3 to about 12 carbon atoms.

5. The color concentrate of claim 3 wherein the diene is selected from the group consisting of butadiene, pentadiene, and isoprene.

6. The color concentrate of claim 1 wherein (a) is polypiperylene.

7. The color concentrate of claim 1 wherein (b) has a melt index from about 0.5 to about 50 gm/10 min.

8. The color concentrate of claim 1 wherein (b) is a copolymer of ethylene, propylene, or butylene, and a methyl, ethyl, propyl or butyl ester of acrylic acid or methacrylic acid.

9. The color concentrate of claim 1 wherein (b) is an ethylene-acrylate or methacrylate or butylene-acrylate or methacrylate copolymer.

10. The color concentrate of claim 1 wherein (a) is present in an amount from 7% to about 25% by weight, (b) is present in an amount from about 2% up to about 15% by weight, and (c) is present in an amount from at least about 50% by weight.

11. The color concentrate of claim 1 further comprising (d) a surface active agent.

12. The color concentrate of claim 11 wherein (d) is a glyceride ester.

13. The color concentrate of claim 11 wherein (d) is at least one phosphate ester.

14. The color concentrate of claim 11 wherein (d) is present in an amount from about 0.1% to about 2% and (c) is present on a basis of at least 25% by volume.

15. An color concentrate comprising (a) polypiperylene, and (b) at least one polymer of ethylene or butylene and an acrylate or a methacrylate, and (c) at least one organic colorant from about 25% up to about 95% by weight.

16. The color concentrate of claim 15 wherein (b) is a copolymer of ethylene and methyl or ethyl acrylate.

17. The color concentrate of claim 15 further comprising (d) from about 0.1% to about 2% of at least one surface active agent.

18. The color concentrates of claims 17 wherein the surface active agent is a phosphate ester.

19. A method of preparing a color concentrate comprising the steps of:

i. providing at least one resin selected from the group consisting of a homopolymer of a diene, a rosin material, a coumarone-indene resin, a polymer of a vinyl aromatic monomer having an $\overline{Mn}$ of from about 500 to about 4000 and mixture of resins (a) having a melt viscosity from about 500 to about 3000 poise at 110° C. at a shear rate of 100 sec$^{-1}$;

ii. providing at least one resin selected from the group consisting of a copolymer of an olefin and an acrylate or a methacrylate, a polymer of a vinyl aromatic monomer having an $\overline{Mn}$ of at least about 10,000 and mixture of resins (b) having a melt index from about 0.5 to about 50 gm/10 minute;

iii. providing at least one organic colorant or mixture of organic colorants; (c) and iv. mixing by weight from about 5% to about 25% of said component (a) with from about 1% to about 25% of said component (b) and from about 25% to about 95% of said component (c) so as to provide said color concentrate wherein the color concentrate prepared is free of wax.

20. The color concentrate of claim 1 wherein (a) is present in amount from at least 8% to about 25% by weight.

* * * * *